US010671394B2

(12) United States Patent
Britto et al.

(10) Patent No.: US 10,671,394 B2
(45) Date of Patent: Jun. 2, 2020

(54) PREFETCH STREAM ALLOCATION FOR MULTITHREADING SYSTEMS

(71) Applicant: International Business Machines Corporation, Armonk, NY (US)

(72) Inventors: Vivek Britto, Austin, TX (US); George W. Rohrbaugh, III, Charlotte, VT (US); Mohit Karve, Austin, TX (US); Brian Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/177,273

(22) Filed: Oct. 31, 2018

(65) Prior Publication Data
US 2020/0133671 A1 Apr. 30, 2020

(51) Int. Cl.
*G06F 12/00* (2006.01)
*G06F 9/345* (2018.01)
(Continued)

(52) U.S. Cl.
CPC ............ *G06F 9/3455* (2013.01); *G06F 9/383* (2013.01); *G06F 9/3861* (2013.01); *G06F 9/4881* (2013.01); *G06F 9/5016* (2013.01)

(58) Field of Classification Search
CPC ............... G06F 9/3455; G06F 9/383
(Continued)

(56) References Cited

U.S. PATENT DOCUMENTS 5,497,477 A * 3/1996 Trull ..................... G06F 12/124
711/133
6,571,318 B1 5/2003 Sander et al.
(Continued)

FOREIGN PATENT DOCUMENTS

CN 106021128 A 10/2016

OTHER PUBLICATIONS

Bell, Ian et al.; "Supporting microthread scheduling and synchronisation in CMPs", International Journal of Parallel Programming, 2006, vol. 34, pp. 343-381.
(Continued)

*Primary Examiner* — Jae U Yu
(74) *Attorney, Agent, or Firm* — Cantor Colburn LLP; Bryan Bortnick

(57) ABSTRACT

A computer system for prefetching data in a multithreading environment includes a processor having a prefetching engine and a stride detector. The processor is configured to perform requesting data associated with a first thread of a plurality of threads, and prefetching requested data by the prefetching engine, where prefetching includes allocating a prefetch stream in response to an occurrence of a cache miss. The processor performs detecting each cache miss, and based on detecting the cache miss, monitoring the prefetching engine to detect subsequent cache misses and to detect one or more events related to allocations performed by the prefetching engine. The processor further performs, based on the stride detector detecting a selected number of events, directing the stride detector to switch from the first thread to a second thread by ignoring stride-1 allocations for the first thread and evaluating stride-1 allocations for potential strided accesses on the second thread.

20 Claims, 6 Drawing Sheets

(51) Int. Cl.
*G06F 9/38* (2018.01)
*G06F 9/50* (2006.01)
*G06F 9/48* (2006.01)

(58) Field of Classification Search
USPC .......................................................... 711/137
See application file for complete search history.

(56) References Cited

U.S. PATENT DOCUMENTS

| | | |
|---|---|---|
| 6,636,945 B2 | 10/2003 | Nakamura |
| 7,487,296 B1 | 2/2009 | Lacobovici et al. |
| 7,761,667 B2 | 7/2010 | Donawa et al. |
| 8,078,831 B2 | 12/2011 | Wang et al. |
| 9,026,739 B2 | 5/2015 | Manne et al. |
| 9,292,447 B2 | 3/2016 | Roy et al. |
| 2003/0126591 A1* | 7/2003 | Wu ........................ G06F 8/4442 717/158 |
| 2006/0059311 A1 | 3/2006 | Van De Waerdt et al. |
| 2016/0117250 A1 | 4/2016 | Lee et al. |

OTHER PUBLICATIONS

Chinese Patent No. 106021128; Date of Publication: Oct. 12, 2016; Machine Translation, 11 pages.
Ungerer, Theo et al.; "Multithreaded Processors", The Computer Journal, 2002, vol. 45, No. 30 Pages.

\* cited by examiner

138

| Tag | Address | Stride |
|-----|---------|--------|
| 1 | A | |
| 1 | A+2 | 2 |
| 1 | A+5 | 3 |
| 1 | A+8 | 3 |
| 0 | A+X | X-8 |
| | | |

FIG. 4

PREFETCH STREAM ALLOCATION FOR MULTITHREADING SYSTEMS

BACKGROUND

The present invention relates to computer system cache memory access, and more specifically, to a system including a prefetcher configured to detect data streams that stride multiple cache lines and configured to switch between multiple threads in a multithreading system or environment.

In the field of computers or computing systems, it is common to prefetch instructions or data from a memory location to a local cache memory in order to improve performance. In simultaneous multithreading configurations, where data streams are executed in parallel, prefetching strategies are more complex than single thread prefetching. Prefetching in multithreading environments can thus involve incorporating additional complexity, such as by adding more memory to a chip or adding hardware to the chip.

SUMMARY

According to one embodiment, a computer system for prefetching data in a multithreading environment includes a memory including a local cache and a processor operatively connected to the local cache. The processor includes a prefetching engine and a stride detector, and is configured to perform requesting data associated with a first thread of a plurality of threads, and prefetching requested data from a cache structure into the local cache by the prefetching engine, where prefetching includes allocating a prefetch stream in response to an occurrence of a cache miss. The processor also performs detecting, by the stride detector, each cache miss, and based on detecting the cache miss, monitoring the prefetching engine to detect subsequent cache misses and to detect one or more events related to allocations performed by the prefetching engine. The processor further performs, based on the stride detector detecting a selected number of events, directing the stride detector to switch from the first thread to a second thread by ignoring stride-1 allocations for the first thread and evaluating stride-1 allocations for potential strided accesses on the second thread.

According to another embodiment, a method of prefetching data in a multithreading environment is provided. The method includes requesting, by a processor including a local cache, data associated with a first thread of a plurality of threads, and prefetching requested data from a cache structure into the local cache by a prefetching engine, where prefetching includes allocating a prefetch stream in response to an occurrence of a cache miss. The method also includes detecting, by a stride detector, the cache miss, and based on detecting the cache miss, monitoring the prefetching engine to detect subsequent cache misses and to detect one or more events related to allocations performed by the prefetching engine. The method further includes, based on the stride detector detecting a selected number of events, directing the stride detector to switch from the first thread to a second thread by ignoring stride-1 allocations for the first thread and evaluating stride-1 allocations for potential strided accesses on the second thread.

According to a further embodiment, a computer program product including a computer readable storage medium having program instructions embodied therewith is provided. The program instructions are executable by a processing system to perform a method that includes requesting, by a processor including a local cache, data associated with a first thread of a plurality of threads, and prefetching requested data from a cache structure into the local cache by a prefetching engine, wherein prefetching includes allocating a prefetch stream in response to an occurrence of a cache miss. The method also includes detecting, by a stride detector, the cache miss, and based on detecting the cache miss, monitoring the prefetching engine to detect subsequent cache misses and to detect one or more events related to allocations performed by the prefetching engine. The method further includes, based on the stride detector detecting a selected number of events, directing the stride detector to switch from the first thread to a second thread by ignoring stride-1 allocations for the first thread and evaluating stride-1 allocations for potential strided accesses on the second thread.

BRIEF DESCRIPTION OF THE DRAWINGS

FIG. 4 depicts an example of a stride detection table;

DETAILED DESCRIPTION

One or more embodiments of the present invention provide a system and method for prefetching data. The system includes a prefetching engine and a stride detector configured so that the prefetching engine can perform prefetching for multiple threads in a multithreading environment. The stride detector detects cache misses that occur for an existing thread, and automatically switches from the existing thread to another thread in response to detecting a selected number of events. The selected number of events may be a selected number of clock cycles or a selected number of prefetch allocations. In one embodiment, the prefetching engine is configured to switch between successive threads according to a round-robin schedule.

In one embodiment, at least one thread is configured to support "stride-N" prefetching. The selected number of events that cause switching between threads may be a selected number of cache misses that are detected without a successful stride-N allocation to a prefetch stream.

The embodiments described herein provide a number of advantages and technical effects. The embodiments provide an effective technique for stride prefetching among multiple cachelines in single and multithreading systems, without requiring the additional logic and complexity that would be needed by using conventional techniques. For example, in multithreading configurations, a conventional approach is to replicate the history table for each thread. However, this approach requires far more logic, which entails a significant power and area cost. This approach can also result in this logic sitting idle if any single-thread applications are run. The embodiments allow for effective Stride-N prefetching without these drawbacks.

Figure 1:
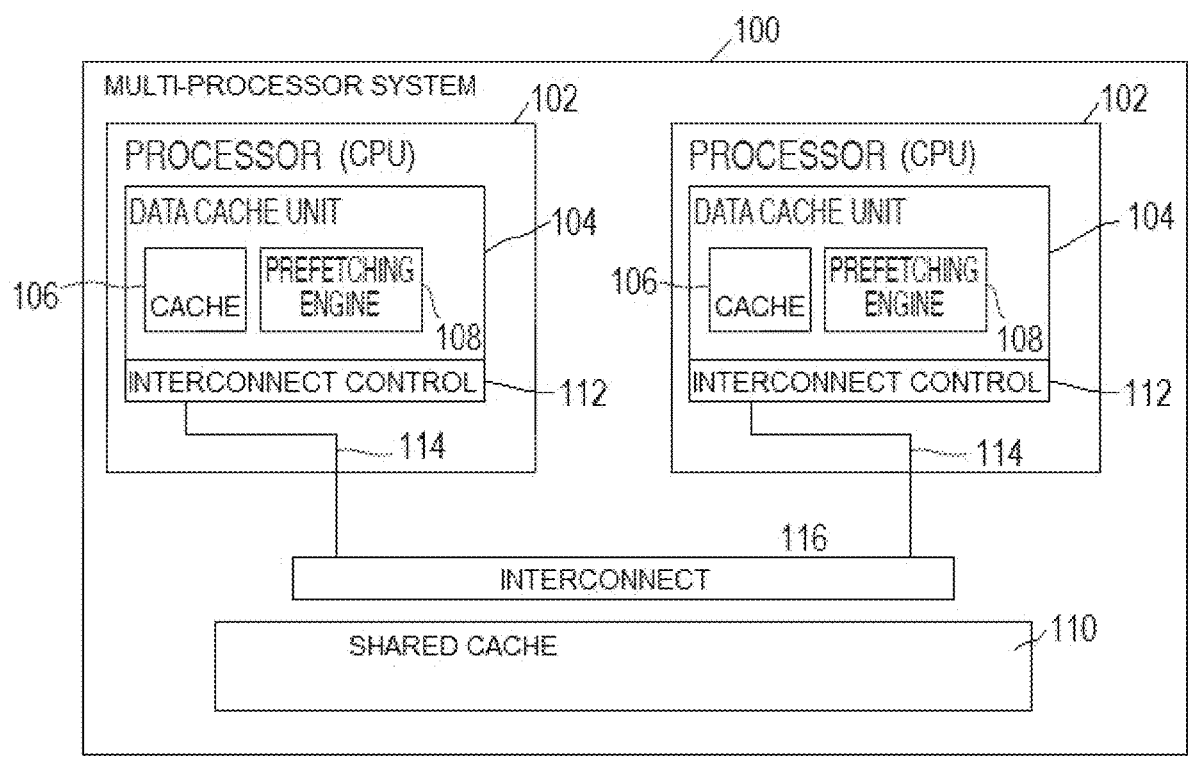
FIG. 1 is a block diagram showing a multi-processor system, according to one or more embodiments of the present invention.

FIG. 1 depicts an embodiment of a processing system 100 that is configured to perform aspects of embodiments described herein. In one embodiment, the processing system 100 is a multi-processor system 100 that includes a plurality of processing units 102, such as processor cores. Each processing unit 102 may include a central processing unit (CPU) and includes a cache unit 104. The cache unit 104 includes at least one local cache 106, which may be a single cache structure or multiple cache structures. For example, the local cache 106 includes a data cache and/or an instruction cache into which data and/or instructions are prefetched from another memory location. An example of a local cache is a level-1 (L1) data cache. Each processing unit 102 includes or is connected to a prefetching engine 108. The prefetching engine 108 may be incorporated with the cache unit 106 or located elsewhere.

As shown in FIG. 1, each processing unit 102 has a respective prefetching engine 108. However, the system 100 is not so limited. For example, multiple processing units 102 may share a single prefetching engine 108.

The system 100 includes and/or is connected to one or more memory locations from which the prefetching engine 108 prefetches data and/or instructions. For example, the system 100 includes a shared cache 110, such as a level-2 (L2) cache. Each processing unit 102 may include interconnect control logic 112, which connects each processing unit 102 via communication buses 114 to an interconnect 116. The interconnect 116 facilitates access to the shared cache 110. Other examples of memory locations from which data and/or instructions can be prefetched include level-3 (L3) caches, main memory and external memory locations such as hard drives and databases.

The system 100 is configured to support multithreading operations. In one embodiment, the system 100 supports various levels of simultaneous multithreading (SMT). Levels of SMT generally correspond to the number of threads that can be executed in parallel or simultaneously. In this embodiment, each processing unit 102 has components such as sharing logic that allows the processing unit 102 to select a thread, and fetch data and/or instructions from memory locations such as the shared cache 110 to execute the thread. The prefetching engine 108 prefetches data and/or instructions from the shared cache 110 and/or other locations, as discussed further below.

In one embodiment, the prefetching engine 108 is implemented in hardware and is configured to perform hardware prefetches of data requested by the processing unit 102 when executing a thread. It is noted that, although the prefetching processes described herein are hardware prefetching processes, embodiments described herein may also be applicable to software prefetching processes.

In one embodiment, the prefetching engine 108 is configured to perform a "stride-based" method in which the prefetching engine 108 detects cache misses that are of a fixed distance from one to another. If a cache miss is detected, i.e., the local cache 106 does not have a requested data block, the requested data is accessed from its address in memory (e.g., in the shared cache 110).

The prefetching engine 108 detects patterns in memory access requests based on a number of memory elements (e.g., blocks, bytes, cachelines, etc.) that separate addresses in successive memory access requests. Such patterns are referred to herein as "stride patterns" or "strides," and the distance as measured by the number of memory elements may be referred to as a stride length or stride distance.

In one embodiment, the stride of an address pattern relates to a number of cachelines in an address structure that separate successive memory access addresses in the address structure. An application that executes on a thread may require different stride detection capabilities. For example, an application can require "stride-1" prefetching, in which elements of a data array are accessed in succession, or "stride-N" prefetching, in which elements are accessed in a stride over multiple cachelines.

Hardware that would be conventionally used to implement a prefetcher which can detect data streams that stride more than one cacheline is significantly more complex than that required for a prefetcher which only covers stride-1 streams. A stride-1 prefetcher only requires the monitoring of the single next-expected address, which if accessed will confirm the data stream. A conventional multi-cacheline stride (stride-N) prefetcher, on the other hand, holds a history table of past accesses in order to determine if they are in fact part of a data stream with a specific pattern, or whether they are instead simply random unrelated accesses.

This issue becomes much more pronounced in SMT (simultaneous multithreading) configurations. Here, accesses from each thread are seen by the prefetcher in an indeterminate order, and it becomes much more difficult for the prefetcher to determine which accesses truly constitute a data stream and which do not. Entries in a limited-size history table will most likely get evicted before they can see enough accesses from a particular thread's strided data stream to confirm the data stream and start prefetching the appropriate cachelines.

In one embodiment, the prefetching engine 108 is configured to detect multiple threads, and select one thread for stride-N detection based on pre-selected criteria. In one embodiment, aspects of stride-N detection (which are discussed in further detail below) are performed by stride detection logic included in or in communication with the prefetching engine 108. The stride detection logic is referred to herein as a "stride detector" or "stride-N detector". In one embodiment, the prefetching engine 108 tracks all threads simultaneously for stride-1 streams, and shares a single stride detector across all threads for stride-N detection.

For example, the prefetching engine 108 can monitor an existing data stream associated with an existing thread (i.e., a thread that is latched onto the prefetching engine 108), and cause the stride detector to switch to another thread when a selected number of events has been detected.

In one embodiment, the prefetching engine 108 switches stride-N detection between threads in a round-robin manner. In this embodiment, threads are given control of the stride detector according to a round-robin schedule, in which the prefetching engine 108 switches the stride detector between threads in order after a selected amount of time or number of events, without giving a priority to any given thread.

As an illustration, assume that the processing unit 102 executes a plurality of threads, identified as threads T1, T2, T3 and T4. The thread identifiers may be stored by the prefetching engine 108 in any suitable manner, such as by a thread queue. The prefetching engine 108 prefetches data for all threads from the shared cache 110 into different prefetch streams that are used to retrieve and store the prefetched data in the local cache 106. In this example, the prefetching engine 108 allows the T1 thread temporary control of the stride detector. If the T1 thread does not allocate a stride-N stream before a number ("M") events are detected, the prefetching engine 108 stops sending prefetch stream allocations for thread T1 to the stride detector and switches to thread T2.

Switching the thread T2 allows control of the stride detector by the thread T2. Thread T2 is then processed by the stride detector until M events are detected without the T2 thread allocating a stride-N stream, at which point the prefetching engine 108 switches control of the stride detector to thread T3. Thread T3 is then processed until M events are detected without a stride-N stream allocation, after which the prefetching engine switches control of the stride detector to thread T4. In this example, once M events are detected during execution of thread T4 without a stride-N allocation, the prefetching engine 108 returns control of the stride detector to thread T1.

As the prefetching engine 108 is used to facilitate switching control of the stride detector between multiple threads, the system 100 permits the use of the same amount of hardware as would be used for a single thread stride detector. As stride detection logic for identifying events is only necessary before the prefetching engine 108 has latched onto a stream, this gives each thread a chance to have its strided data streams detected, and allows prefetching to continue on these detected streams after the stride detection logic has moved onto the next thread.

Switching between threads occurs after a selected time or number of events, which is the same for each thread when a round-robin schedule is used. For example, switching can be performed after a selected number of clock cycles is reached or after a selected number of prefetch stream allocations has been performed.

In one embodiment, the stride detector switches between threads after a certain number of normal prefetch allocations (normal prefetch allocations occur on cache misses which do not match any existing prefetch stream). This embodiment may be advantageous, for example, for workloads where data accesses are relatively sparse. For example, if thread switching occurs after a selected number of clock cycles, it might occur that a thread switch would happen before a thread was able to latch onto its strided stream. This embodiment ensures that each thread gets a chance to have a sufficient number of its data misses seen by the stride detector in order to allow it to try and discern a pattern.

In one embodiment, the stride detector switches to the next thread after a certain number of prefetch allocations occur without a successful Stride-N allocation. In some multithreading scenarios, each thread may be running a different application, only some of which perform strided data accesses. In these cases, it would not be ideal to switch off of a thread that is making use of stride detection logic and cycle through the remaining threads instead. This embodiment ensures that if a thread is doing useful Stride-N work, it will be able to continue without interruption.

Figure 2:
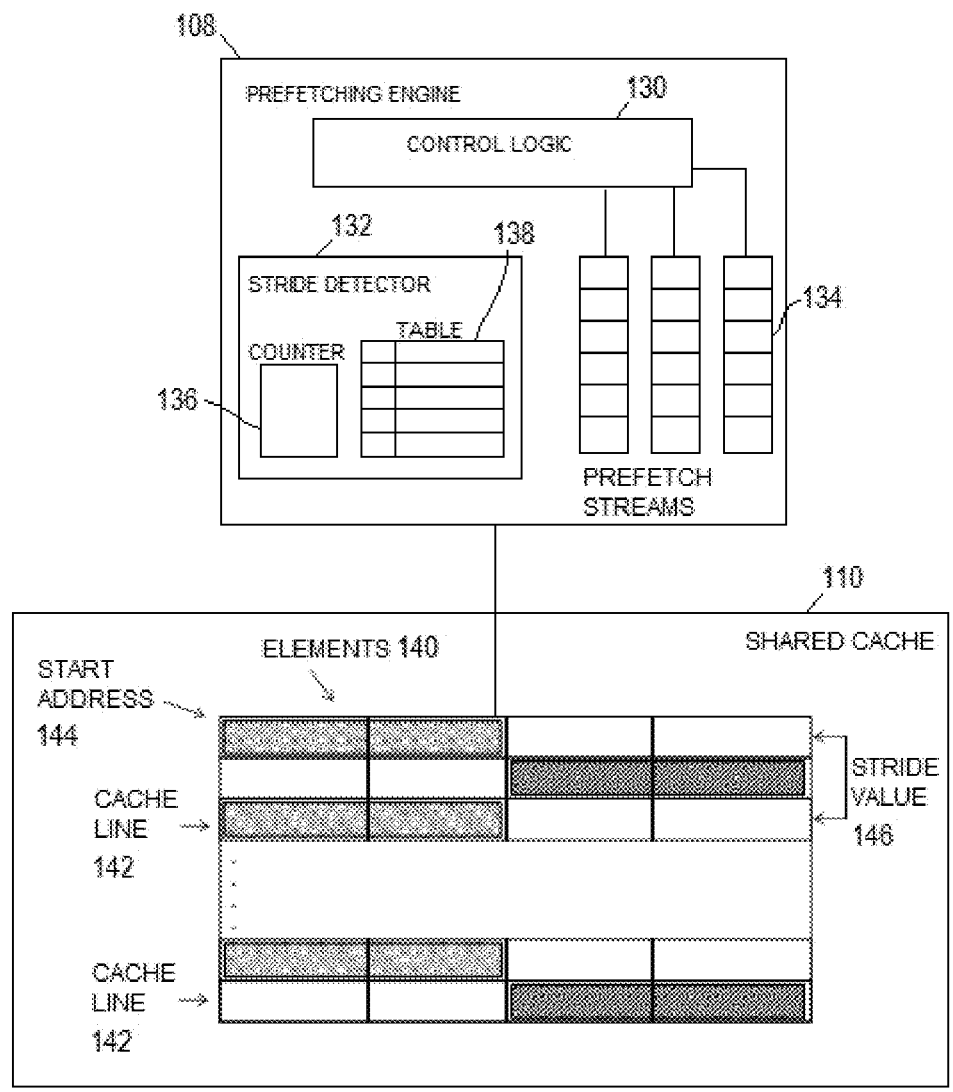
FIG. 2 depicts a prefetching engine including a stride detector, and a cache structure, according to one or more embodiments of the present invention.

FIG. 2 shows an example of the prefetching engine 108. The prefetching engine 108 includes control logic 130 and a stride detector, referred to herein as a stride-N detector 132. The control logic 130 performs prefetching operations by prefetching data from addresses requested by the processing unit 102 when executing a thread. In one embodiment, the control logic 130 prefetches data from addresses in the shared cache 110 as a prefetch stream 134 according to a stride pattern that is detected by the stride-N detector 132.

The stride-N detector 132 is configured to detect data streams that may be associated with one thread or multiple threads. The stride-N detector 132 includes a counter 136 and a table 138 or other data structure that stores stride information, which is referred to herein as a stride detection table 138. The stride detection table 138 stores a selected number of the most recent accesses for a currently executed thread. This eliminates the need for a separate history table for each thread.

FIG. 2 also includes a block diagram of the shared cache 110, which includes a plurality of elements 140 that can span a plurality of cachelines 142. A data stream associated with a given thread may be defined by a starting address 144 and a stride value 146, which indicates a number of cachelines 142 between successive elements in the data stream.

Figure 3:
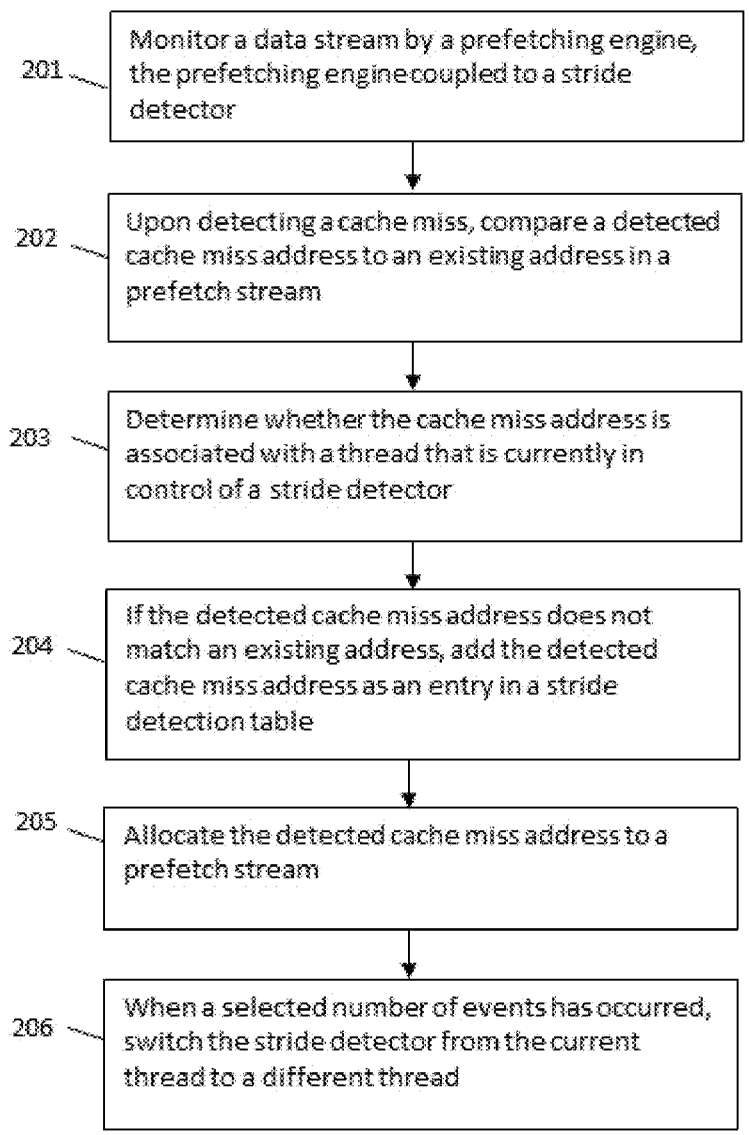
FIG. 3 is a flowchart depicting an embodiment of a method of prefetching data.

FIG. 3 illustrates an embodiment of a method 200 for prefetching data in a multithreading environment. The method 200 may be performed by a processor, OS or other suitable application or program. Although the method 200 is discussed in conjunction with the system 100, the method 200 is not so limited. The method 200 is discussed in conjunction with blocks 201-206. The method 200 is not limited to the number or order of steps therein, as some steps represented by blocks 201-206 may be performed in a different order than that described below, or fewer than all of the steps may be performed.

In the method 200, a processing unit 102 executes multiple threads via shared logic. When a thread is executed, the processing unit 102 requests data from a cache structure, such as the shared cache 110. As the thread is executed, a data stream is sent to the processing unit 102 including the requested data. Data is requested from various addresses and may be prefetched into the local cache 106, e.g., an L1 cache. Data in the shared cache 110 may occur on sequential or non-sequential lines in the shared cache 110.

The prefetching engine 108 prefetches data via a prefetch stream 134 from addresses based on a detected pattern. To begin a prefetch stream, the prefetching engine 108 either increments or decrements the real address of a cacheline miss according to the detected pattern.

At block 201, the prefetching engine 108 monitors an existing data stream to detect when cache misses occur. A cache miss occurs when a block of data requested for the data stream is not detected in the local cache 106. When a cache miss occurs, the processing unit 102 or a cache controller retrieves the requested data from an address of the requested data in the shared cache 110. The address of the requested data in the shared cache 110 is referred to as a cache miss address.

At block 202, the prefetching engine 108 compares the cache miss address to existing prefetch streams and begins a stream detection process upon detecting a cache miss address that does not match an address in an existing prefetch stream.

At block 203, when the cache miss address does not match an existing prefetch stream 134, the prefetching engine 108 determines whether the cache miss address is associated with the thread that is currently controlling the stride-N detector 132.

At block 204, if the cache miss address is associated with the thread that is currently controlling the stride-N detector, a new entry is entered in the stride-N detector 132, by adding the entry to the stride detection table 138. The entry includes a tag (e.g., indicating whether stride-N detection is enabled), and a subset of the cache miss address. All of the previously existing entry addresses in the stride detection table 138 are subtracted from this new address in turn, and a stride between each address is entered into its appropriate entry. It is noted that block 204 is performed for the thread that is currently controlling the stride-N detector 132; if the cache miss address is not associated with the thread that is currently controlling the stride-N detector 132, block 204 is skipped and the method proceeds to block 205.

FIG. 4 shows an example of the stride detection table 138. The stride detection table 138 includes a number of entry columns, such as a tag column, an address column that includes a subset of a cache miss address, and a stride value. It is noted that this table is only an example, as the table may take other forms, e.g., have a different number of columns and/or include additional information.

In this example, previously existing entries are shown, where a first entry is for an address of a cacheline in the shared cache, denoted as "A". A subsequent entry is for a cacheline address "A+2", which is two cachelines away from the address A. The difference between the two is two cachelines, thus the stride value associated with address A+2 is 2. A next entry is for address "A+5", thus the stride value is 3. A most recent entry is for address "A+8", also having a stride value of 3.

Referring again to FIG. 3, at block 205, the address of the new entry (or the cache miss address if the cache miss address is not associated with the thread that is currently controlling the stride-N detector 132) is allocated to a prefetch stream 134. In one embodiment, the allocation is based on whether entries in the table have matching stride values.

If any of the stride detection table entries now include two matching strides, a Stride-N prefetch stream is allocated, e.g., as a prefetch stream 134. In the example of FIG. 4, data having the address A+5 and A+8 is allocated to the prefetch stream 134, and additional data from the shared cache 110 may be prefetched according to the associated stride value (in this example the stride pattern is stride-3, so the first address to be prefetched would be A+11).

If none of the entries include two matching stride values, a Stride-1 (single cacheline stride) prefetch stream is allocated instead. The stride detector allocate counter is then incremented and compared to a programmable threshold. If the counter is less than the threshold, the process is complete.

At block 206, after a selected number of events have occurred, the stride-N detector 132 switches to one of the other threads. The stride-N detector 132 and the stride detection table 138 is then cleared to zero to prepare the stride-N detector 132 to service the next thread. As noted above, in one embodiment, switching to the next thread and subsequent threads are performed in a round-robin fashion.

In one embodiment, the selected number of events is a selected number of prefetch allocations performed during execution of a thread. In another embodiment, the selected number of events is a selected number of stride-1 prefetch allocations performed without a successful Stride-N allocation.

Figure 5:
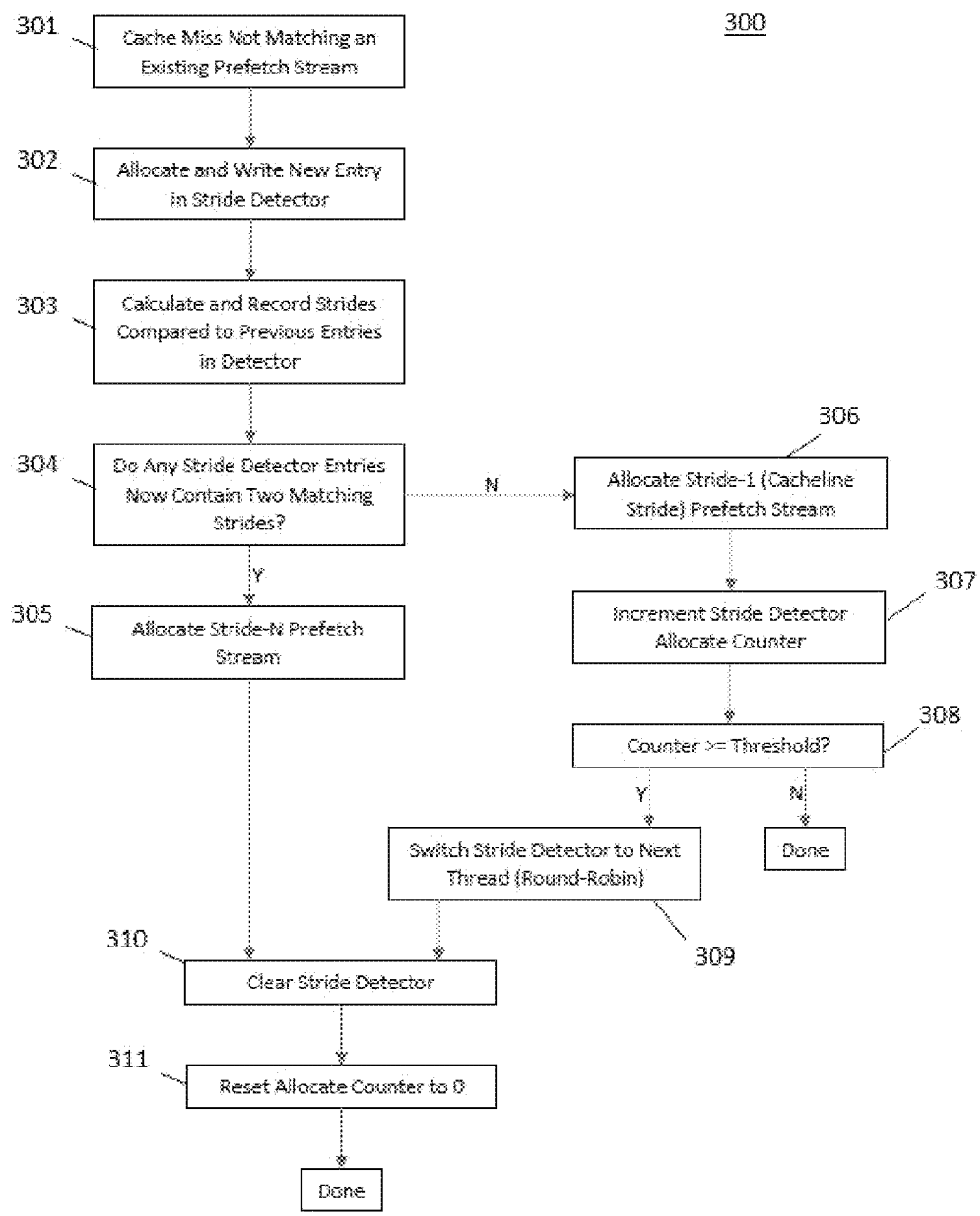
FIG. 5 is a flow chart depicting an embodiment of a method of prefetching data.

FIG. 5 illustrates an embodiment of a method 300 for prefetching data in a multithreading environment. The method 300 may be performed by a processor (hardware), an OS, or other suitable application or program. Although method 300 is discussed in conjunction with the system 100, the method 300 is not so limited. The method 300 is discussed in conjunction with blocks 301-311. The method 300 is not limited to the number or order of steps therein, as some steps represented by blocks 301-311 may be performed in a different order than that described below, or fewer than all of the steps may be performed. In addition, some steps may be performed asynchronously or in parallel.

In the method 300, a processing unit 102 executes multiple threads via sharing logic. When a thread is executed, the processing unit 102 requests data from a cache, such as the shared cache 110. As the thread is executed, a data stream is sent to the processing unit 102 including the requested data. Data is requested from various addresses, which may be prefetched into, e.g., the L1 cache. Data in the shared cache 110 may be accessed on sequential or non-sequential lines in the shared cache 110.

The prefetching engine 108 prefetches data via a prefetch stream 134 from addresses based on a detected pattern. To begin a prefetch stream, the prefetching engine 108 either increments or decrements the real address of a cacheline miss according to the detected pattern.

At block 301, when a cache miss is detected, the prefetching engine 108 determines whether the cache miss address matches an existing prefetch stream 134. At block 302, if the cache miss address does not match an existing prefetch stream, a new entry is written into the stride detection table 138. The stride-N detector 132 then calculates a stride value for the new entry in relation to the addresses of existing entries in the stride detection table 138 (block 303). For example, the immediately preceding entry address is subtracted from the address of the new entry to calculate the stride value for the new entry.

At block 304, the stride-N detector 132 determines whether any of the table entries have matching stride values. If so, at block 305, a stride-N prefetch stream is allocated.

If none of the stride detection table entries have matching stride values, a stride-1 prefetch stream is allocated (block 306) and the number of stride-1 allocations is tracked by, for example, incrementing the allocate counter 136 (block 307).

At block 308, the allocate counter value is compared to a selected threshold number. If the allocate counter value is greater than or equal to the threshold number, the prefetching engine 108 directs the processing unit 102 to switch to the next thread (block 309). If the allocate counter value is less than the threshold number, the method 300 completes and is repeated upon detection of a new cache miss.

At block 310, if either a stride-N prefetch stream is allocated or the counter 136 reaches or exceeds the threshold (indicating that a selected number of allocations have been performed without a successful stride-N allocation), the stride detection table 138 is cleared. The allocate counter 136 is then reset to zero (block 311) and the method 300 completes. The method 300 is performed again for each cache miss that does not match an existing prefetch stream.

Figure 6:
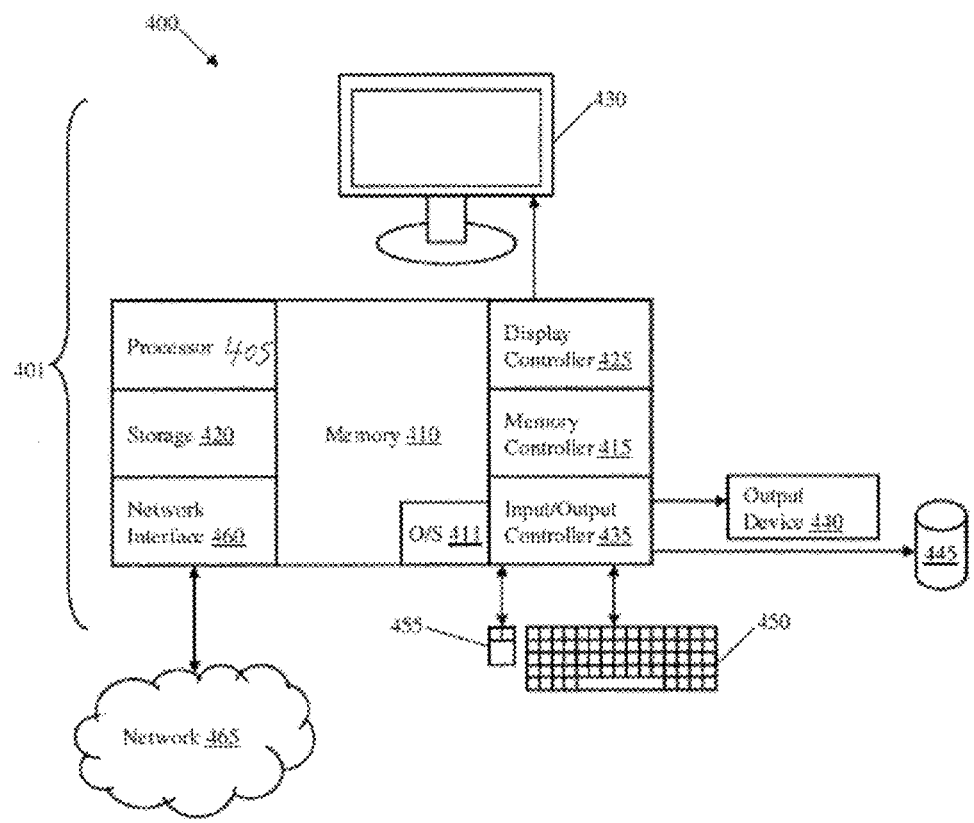
FIG. 6 is a block diagram that depicts an embodiment of a computing system that can perform methods according to one or more embodiments of the present invention.

FIG. 6 depicts a block diagram of a system 400 for performing the methods described herein. The methods described herein can be implemented in hardware, software (e.g., firmware), or a combination thereof. In an exemplary embodiment, the methods described herein are implemented in hardware as part of the microprocessor of a computer, such as a personal computer, workstation, minicomputer, or mainframe computer. The system 400, therefore, includes a computer 401 as illustrated in FIG. 6.

In an exemplary embodiment, in terms of hardware architecture, as shown in FIG. 6, the computer 401 includes processor 405 (e.g., the processing unit 102 or core of FIG. 1). The computer 401 further includes memory 410 (e.g., main memory) coupled to a memory controller 415, and one or more input and/or output (I/O) devices 440, 445 (or peripherals) that are communicatively coupled via a local input/output controller 435. The input/output controller 435 can be, for example, but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 6, the instructions in the memory 410 can include a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465.

When the computer 401 is in operation, the processor 405 is configured to fetch and execute instructions stored within the memory 410, to communicate data to and from the memory 410, and to generally control operations of the computer 401 pursuant to the instructions.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for prefetching data in a multi-threading environment, the system comprising:
    a memory including a local cache;
    a processor operatively connected to the local cache, the processor including a prefetching engine and a stride detector, the processor configured to perform:
        requesting, by the processor, data associated with a first thread of a plurality of threads;
        prefetching requested data from a cache structure into the local cache by the prefetching engine, wherein prefetching includes allocating a prefetch stream in response to an occurrence of a cache miss;
        detecting, by the stride detector, each cache miss;
        based on detecting the cache miss, monitoring the prefetching engine to detect subsequent cache misses and to detect one or more events related to allocations performed by the prefetching engine; and
        based on the stride detector detecting a selected number of events, directing the stride detector to switch from the first thread to a second thread by ignoring stride-1 allocations for the first thread and evaluating stride-1 allocations for potential strided accesses on the second thread.

2. The computer system of claim 1, wherein the prefetching engine is configured to direct the stride detector to switch between each of the plurality of threads in order according to a round-robin schedule.

3. The computer system of claim 1, wherein the selected number of events is a selected number of prefetch stream allocations.

4. The computer system of claim 1, wherein the prefetching engine is configured to support both stride-1 prefetching and stride-N prefetching.

5. The computer system of claim 4, wherein the selected number of events is a number of prefetch stream allocations without a successful stride-N prefetch stream allocation.

6. The computer system of claim 1, wherein the stride detector is connected to a stride detection table, the stride detection table including an entry for each cache miss detected by the stride detector during processing of the first thread, wherein a respective entry includes a subset of a cache structure address associated with a respective cache miss and a stride value or values relative to an address of an existing entry or entries, the stride value or values indicating a number of cachelines in the address structure between the address associated with the respective cache miss and the address in the existing entry or entries.

7. The computer system of claim 6, wherein the stride detector is configured to, in response to detecting a cache miss, add a new entry to the stride detection table, and calculate a stride value or values for the new entry in relation to the existing entry or entries in the stride detection table.

8. The computer system of claim 1, wherein the processor is configured to perform simultaneous multithreading (SMT).

9. A method of prefetching data in a multithreading environment, the method comprising:
   requesting, by a processor including a local cache, data associated with a first thread of a plurality of threads;
   prefetching requested data from a cache structure into the local cache by a prefetching engine, wherein prefetching includes allocating a prefetch stream in response to an occurrence of a cache miss;
   detecting, by a stride detector, the cache miss;
   based on detecting the cache miss, monitoring the prefetching engine to detect subsequent cache misses and to detect one or more events related to allocations performed by the prefetching engine; and
   based on the stride detector detecting a selected number of events, directing the stride detector to switch from the first thread to a second thread by ignoring stride-1 allocations for the first thread and evaluating stride-1 allocations for potential strided accesses on the second thread.

10. The method of claim 9, wherein the prefetching engine is configured to direct the stride detector to switch between each of the plurality of threads in order according to a round-robin schedule.

11. The method of claim 9, wherein the selected number of events is a selected number of prefetch stream allocations.

12. The method of claim 9, wherein the prefetching engine is configured to support both stride-1 prefetching and stride-N prefetching, and the selected number of events is a number of prefetch stream allocations without a successful stride-N prefetch stream allocation.

13. The method of claim 9, wherein the stride detector is connected to a stride detection table, the stride detection table including an entry for each cache miss detected by the stride detector during processing of the first thread, wherein a respective entry includes a subset of a cache structure address associated with a respective cache miss and a stride value or values relative to an address of an existing entry or entries, the stride value or values indicating a number of cachelines in the address structure between the address associated with the respective cache miss and the address in the existing entry or entries.

14. The method of claim 13, wherein the stride detector is configured to, in response to detecting a cache miss, add a new entry to the stride detection table, and calculate a stride value or values for the new entry in relation to the existing entry or entries in the stride detection table.

15. The method of claim 9, wherein the processor is configured to perform simultaneous multithreading (SMT).

16. A computer program product comprising a non-transitory computer readable storage medium having program instructions embodied therewith, the program instructions executable by a processing system to perform:
   requesting, by a processor including a local cache, data associated with a first thread of a plurality of threads;
   prefetching requested data from a cache structure into the local cache by a prefetching engine, wherein prefetching includes allocating a prefetch stream in response to an occurrence of a cache miss;
   detecting, by a stride detector, the cache miss;
   based on detecting the cache miss, monitoring the prefetching engine to detect subsequent cache misses and to detect one or more events related to allocations performed by the prefetching engine; and
   based on the stride detector detecting a selected number of events, directing the stride detector to switch from the first thread to a second thread by ignoring stride-1 allocations for the first thread and evaluating stride-1 allocations for potential strided accesses on the second thread.

17. The computer program product of claim 16, wherein the stride detector is configured to direct the prefetching engine to switch between each of the plurality of threads in order according to a round-robin schedule.

18. The computer program product of claim 16, wherein the selected number of events is a selected number of prefetch stream allocations.

19. The computer program product of claim 16, wherein the prefetching engine is configured to support both stride-1 prefetching and stride-N prefetching, and the selected number of events is a number of prefetch stream allocations without a successful stride-N prefetch stream allocation.

20. The computer program product of claim 16, wherein the stride detector is connected to a stride detection table, the stride detection table including a respective entry for each cache miss detected by the stride detector during processing of a thread, the respective entry including a subset of an address in the cache structure associated with a respective cache miss and a stride value or values relative to an address of an existing entry or entries, the stride value or values indicating a number of cachelines in the address structure between the address associated with the respective cache miss and an address in an existing entry or entries; and
   the stride detector is configured to, in response to detecting a cache miss, add a new entry to the stride detection table, and calculate a stride value or values for the new entry in relation to the existing entry or entries in the stride detection table.

* * * * *